United States Patent [19]
Maier et al.

[11] 3,733,758
[45] May 22, 1973

[54] MECHANISM FOR UNFOLDING ACCORDION-LIKE FOLDED STRUCTURAL ELEMENTS

[75] Inventors: Horst Maier, Munich; Erich Arbeitlang, Ottobrunn; Peter Kleber, Munich, all of Germany

[73] Assignee: Messerschmidt-Bolkow-Blohm Gesellschaft mit beschrankter Haftung, Munich, Germany

[22] Filed: Apr. 29, 1971

[21] Appl. No.: 138,451

[30] Foreign Application Priority Data

May 2, 1970 Germany.................P 20 21 580.9

[52] U.S. Cl..........................52/113, 52/71, 52/121, 160/193, 160/229, 244/1 SS
[51] Int. Cl...............................................B64g 1/10
[58] Field of Search...................52/70, 71, 108, 113, 52/114, 121, DIG. 4; 160/188, 193, 213, 229, 206, 183; 244/1 SS

[56] References Cited

UNITED STATES PATENTS

| 3,525,483 | 8/1970 | Van Alstyne | 160/193 |
| 3,390,587 | 7/1968 | Ratcliff, Jr. | 74/471 |
| 3,292,328 | 12/1966 | Lewis et al. | 52/DIG. 4 |
| 3,532,299 | 10/1970 | Williamson et al. | 244/1 SS |
| 3,326,497 | 6/1967 | Michelson | 244/1 |
| 3,627,585 | 12/1971 | Dollery et al. | 244/1 SS |
| 3,477,662 | 11/1969 | Anderson | 160/188 |
| 3,348,602 | 10/1967 | Olsson | 160/188 |
| 3,217,785 | 11/1965 | Hamilton | 160/188 |
| 3,121,977 | 2/1964 | Bersudsky | 52/DIG. 4 |

FOREIGN PATENTS OR APPLICATIONS

| 449,128 | 9/1927 | Germany |
| 1,050,499 | 2/1959 | Germany |

Primary Examiner—Frank L. Abbott
Assistant Examiner—Leslie A. Braun
Attorney—Woodhams, Blanchard & Flynn

[57] ABSTRACT

Mechanism for unfolding series-connected, accordion-like folded structural elements, particularly for use in supporting large surface solar cells. The several sections to be folded and unfolded are connected by hinge structure including a torsion-bar tensioned when said parts are in a selected on of folded or unfolded conditions. In addition, force transmission means are arranged between panels which rotate in the same direction during movement in response to the urging of said tensioned torsion bars. These force transmission devices ensure that said arm sections will unfold (or fold) at predetermined ratios with respect to each other, regardless of the effectiveness of successive individual torsion bars and will further ensure predeterminable response by said arm sections, even if certain of said torsion bars are out of action. If desired, a power means can be applied to operate through said force transmission means for restoring the arm sections against the force of said torsion bars to said selected condition.

11 Claims, 1 Drawing Figure

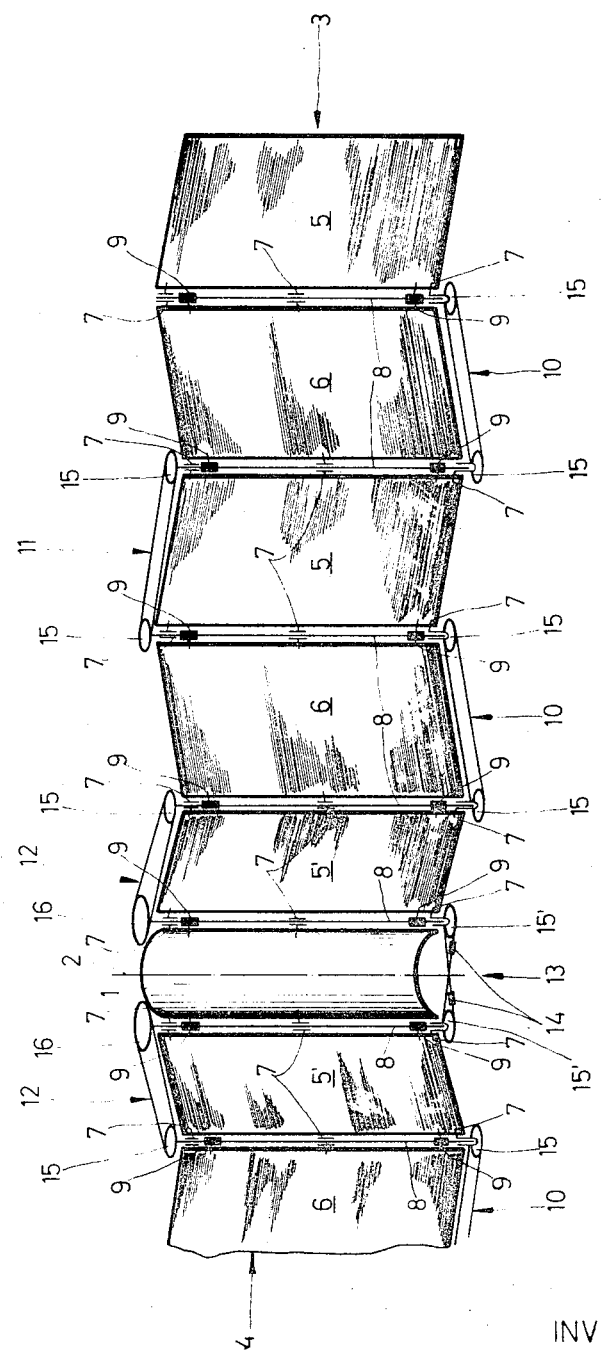

MECHANISM FOR UNFOLDING ACCORDION-LIKE FOLDED STRUCTURAL ELEMENTS

In the conception of large-surface solar-cell arms, particularly for satellites which consist of individual folded panels, there exists the problem of unfolding said panels easily and with a minimum of special apparatus. Considering such criteria as high reliability and redundancy of the unfolding mechanisms, such desirable objectives as a continuous unfolding operation, or the avoidance of restoring moments and the like acting onto the associated space vehicle, are difficult to attain. For example in a space vehicle with so-called solar-cell wings consisting of spiral-shaped foldable panels, which space vehicle is described in U.S. Pat. No. 3,326,497, each panel is connected to the respective following panel through a motorized joint and, for the purpose of unfolding, the individual driving motors of all joints are operated through a sequence control. Such a system represents only a partial solution to the described problem, partly because of weight reasons and partly because of its complicated structure which latter increases its susceptibility to trouble.

The basic purpose of the invention is to produce a mechanism which is suitable for unfolding series-connected, accordionlike folded structural elements, which mechanism is of simple construction and yet satisfied the above-mentioned criteria.

To attain this purpose the invention provides that drive means operate in connection with torsion-bar springs. Said latter are tensioned in the folded position and are associated with structural elements, of which adjacent ones are connected through torsion-bar spring bearings. The drive means consist of two disks each fixedly connected to the associated structural element and a closed drive means, as a belt, connected to said disks for operation therewith. Each of said drive means connect two structural elements which during unfolding rotate in the same direction of rotation.

By selecting torsion-bar springs as unfolding elements, if appropriate, in connection with radial step bearings and by means of drive means which are in operative engagement with said springs, there is assured on the one hand a movement control of the individual structural elements which movement control involves a minimum of frictional drag, and on the other hand the several drive means effect a continuous unfolding operation since they balance out different force components. Further, a definite movement control is obtained by the drive means. Thus, by suitably selecting each disk diameter any desired position of the structural elements is possible after the unfolding. The unfolded structural elements can thereby, as far as this is necessary, be folded again by a central motor which increases the application possibilities.

To control the unfolding speed, speed-dependent damping elements, as pistons or the like, can also be provided to prevent an overstressing of the connections between the structural elements.

The invention will be explained more in detail hereinafter in connection with one exemplary embodiment, namely as applied to solar-cell arms, which is schematically illustrated in the drawing. Further advantageous applications of the invention will be suggested thereby.

The drawing illustrates one-half of a circularly cylindrical central member 1 cut in longitudinal direction thereto, for example a satellite, and solar-cell arms 3 and 4 in partly unfolded position. Such solar-cell arms are arranged symetrically to the longitudinal axis 2 of the central member and are connected to said central member. Both of these arms are constructed identically and hence only one thereof is shown completely. Said arms have equal numbers of plane, rigid structural elements 5 and 6 and the structural elements 5' which are directly associated with the central member 1 are constructed half as long as the remaining structural elements 5 and 6.

Successively adjacent structural elements 5, 5' and 6 are hingedly connected and serve as carrier surfaces for the solar cells (not illustrated). Torsion-bar springs 8 are supported by radial bearings 7 and are fixedly secured on the respectively associated structural element 5, 5' or 6 through axially fixed bearings 9. The same connection is provided between the central member 1 and the two directly following structural elements 5'. The torsion-bar springs 8 are tensioned is the folded position of the arms 3 and 4 and hence will urge the parts in unfolding direction. Thus, the structural elements 5, 5' and 6 can be unfolded safely and with a minimum of frictional resistance.

In order to assure a continuous unfolding operation which is symmetric to the unfolding direction, driving means 10, 11, 12 and 13 are also provided. Each of these consist of two circular disks 15, 15', 15'' or 16 and a closed force transmission means firmly connected therewith, for example a belt or the like. The transmission means 10, 11, 12 and 13 operatively engage one another in such a manner that by rotating any desired structural element, for example one of the structural elements 5' hingedly connected to the central member 1, such rotary movement is transmitted to the remaining structural elements 5, 5' and 6. This makes possible a continuous unfolding operation which takes place even if several of the torsion-bar springs are out of action.

As illustrated in the drawings, this is accomplished by connecting through one of the transmission means 10, elements 5,5' which during an unfolding operation move in the same direction of rotation as the structural element 5' hingedly connected to the central member 1. The transmission means 11 connects the two structural elements 6 which, in contrast to the elements 5', move in opposite directions of rotation. The transmission means 12 are associated at one end with the central member 1 and at the other end with one of the next adjacent structural elements 6. The transmission means 13 having a direction reversal transmission means, here a crossed belt, is provided as a connector between the two arms 3 and 4. All pulleys 15, 15', and 15'' are fixedly secured on the respectively associated structural element 5, 5' and 6 and are mounted coaxially with the respective torsion-bar springs 8, which springs have their opposite ends fixedly connected to the adjacent structural elements. For example, the torsion spring 8, between the central member 1 and the element 5' has its upper end fixedly connected relative to the central member 1 and its lower end fixedly connected relative to the panel 5'. In a similar manner, the torsion spring 8 between the elements 5' and 6 has its upper end fixedly interconnected to the element 6 and its lower end fixedly interconnected to the element 5', and the torsion spring 8 between elements 5 and 6 has its upper end fixedly connected to the element 6 and its lower end fixedly connected to the element 5. The disks 16 of the transmission means 12, which disks are associated with the central member 1, are in the same manner fixedly connected to the central member. Furthermore, all disks 15, 15', and 15'' have the same diameter with the exception of the disks 16 secured to the central member 1. These disks 16 compared with the disks 15, 15' and 15'' have relative diameters corresponding to the desired angular change between the structural elements 5, 5' and 6. In this case the disks 16 are twice the diameter of the disks 15, 15', and 15''. It is noted that all transmission means 10, 11, 12 and 13 can also be arranged in a line along one longitudinal edge which, however, results in an undesirable construction. For this reason the disks 15 and 15' of the drives 10 or 13 are fixedly secured through the respective radial bearings 7 on the associated structural elements 5 and 5', respectfully and the remaining disks 15'' and 16, are fixedly mounted through the respective torsion-bar spring 8 on the associated structural element 6 and central member 1, respectfully.

Different components of force can be balanced out completely during the unfolding of the arms 3 and 4 with a series connection of transmission means 10, 11, 12 and 13. Thus the system is almost independent of externally originating malfunctions. By choosing half structural elements 5' on the central member 1, it is assured that the arms 3 and 4, connected with the central member 1, provide symetrical structure before, during and after the unfolding.

The two arms 3 and 4, the structural elements 5, 5' and 6 which are held together in folded condition, if necessary, by means of straps, can after releasing the holding means be moved synchronously under the effect of the torsion-bar springs 8. Speed-dependent damping elements 14 can be provided, if desired, to avoid thereby an unacceptably high stress on the torsion-bar spring bearings, namely at the end of the unfolding process. This is achieved, as illustrated in the drawing, by axial pistons connected into the crossed transmission means of the drive 13. It can also be provided that the structural elements 5, 5' and 6 can be locked against one another the unfolded position, for example, by magnets arranged on their transverse edges. They can then be combined to form one unit, namely independently from the unfolding mechanism. In case that both arms 3 and 4 are to fold up again, this can be done by a central motor which operates in connection with the drives 10, 11, 12 and 13 and which must overcome the tension of the torsion-bar springs and holding force of the locking elements, for example magnets.

The reliability of the described mechanism can be increased by a redundancy in connecting further drives and torsion-bar springs. Thus the mechanism is not only suitable for unfolding of solar-cell arms; it can also be used in all other folding constructions, for example gate and frame locks or cover, shading-off and bridging devices.

While the foregoing description has been entirely in terms of the resiliency of the torsion bars urging the arms into an extended position and if desired, the application of motor means thereto to restore same to folded position, it is evident that these functions can be reversed, namely, by utilizing the torsion bars to urge the parts toward a folded position and, if desired, utilizing motor means to extend same.

We claim:

1. In an extendible structure having a plurality of structural members movably interconnected to each other, a hinge device coacting between the adjacent ends of each pair of members for hingedly connecting said members to each other in end-to-end relation, said plurality of members being normally folded in an accordian-like manner, and transmission means associated with said members for permitting uniform unfolding of said plurality of members, comprising the improvement wherein said transmission means includes:

a plurality of pulley-like disks including first and second disks disposed adjacent each of several adjacent hinge devices;

means fixedly interconnecting said first pulley-like disk in nonrotatable relationship relative to one of the structural members associated with one hinge device;

means fixedly mounting the second pulley-like disk in non-rotatable relationship relative to the other structural member associated with said one hinge device; and a plurality of motion transmission devices associated with said plurality of disks for effecting uniform unfolding movement of said structural members, each of said motion transmitting devices including a substantially endless motion transmitting element extending between and disposed in engagement with the first disk associated with one hinge device and the second disk associated with an adjacent hinge device.

2. An extendible structure according to claim 1, wherein said first and second disks are coaxially aligned with one another and are coaxially aligned with the hinge axis of the respective hinge device.

3. An extendible structure according to claim 2, wherein each of said motion transmitting elements comprises a flexible and endless cable-like member.

4. An extendible structure according to claim 3, wherein alternate cable-like members are disposed adjacent one longitudinal edge of said plurality of members, and wherein the remaining cable-like members are disposed adjacent the other longitudinal edge of said plurality of members.

5. An extendible structure according to claim 1, wherein each of said hinge devices includes an elongated torsion bar connected between each adjacent pair of structural members for normally resiliently urging said structural members toward their respective unfolded positions, each said torsion bar having one thereof fixedly secured to one of the structural members associated with each adjacent pair, and the other end of the torsion bar being fixedly interconnected relative to the other structural member of each adjacent pair.

6. An extendible structure according to claim 5, wherein said first and second disks are associated with each torsion bar, said first disk being nonrotatably secured to said one end of said torsion bar, and said second disk being nonrotatably secured relative to the other end of said torsion bar.

7. An extendible structure according to claim 6, wherein each of said motion transmitting members comprises an endless and flexible cable-like member extending between and engaged with a pair of disks associated with a pair of adjacent torsion bars.

8. Deployment mechanism for moving a multi-sectioned, accordian-like folded structure of joined-together structural elements with the help of drawing means through disks arranged on the structural elements, particularly for use as a solar cell carrier for space travel purposes, comprising the improvement wherein the disks are alternately nonrotatably connected to the adjacent structural elements, and wherein the drawing means includes a plurality of closed and substantially endless drawing members extending between the engaging the adjacent pairs of disks for preventing slippage therebetween.

9. Deployment mechanism according to claim 8, wherein some of the disks have different diameters.

10. Deployment mechanism according to claim 8, wherein said adjacent pairs of structural elements are hingedly connected in end-to-end relation by means of intermediate hinge rods.

11. Deployment mechanism according to claim 10, wherein each drawing member includes a speed-dependently acting damping element connected thereto.

* * * * *